United States Patent [19]

Hornyak, deceased

[11] Patent Number: 5,370,343
[45] Date of Patent: Dec. 6, 1994

[54] ARRANGEMENT FOR ATTACHMENT AND QUICK DISCONNECT AND JETTISON OF ROCKET BOOSTER FROM SPACE VEHICLE

[75] Inventor: Stephen Hornyak, deceased, late of San Diego, Calif., by Carol Hornyak, leagl representative

[73] Assignee: General Dynamics Corporation Space Systems Division, San Diego, Calif.

[21] Appl. No.: 26,373

[22] Filed: Mar. 4, 1993

[51] Int. Cl.⁵ ............................................. B64G 1/40
[52] U.S. Cl. ............................... 244/172; 102/378
[58] Field of Search ............. 244/54, 58, 172, 137.4; 102/377, 378, 393; 89/1.14, 1.57

[56] References Cited

U.S. PATENT DOCUMENTS

| | | | |
|---|---|---|---|
| 5,117,758 | 6/1992 | Renzi | 244/172 |
| 5,226,616 | 7/1993 | Butkiewicz | 244/172 |
| 5,227,579 | 7/1993 | Gibson et al. | 102/378 |
| 5,257,761 | 11/1993 | Ratz et al. | 244/54 |

*Primary Examiner*—Galen L. Barefoot
*Attorney, Agent, or Firm*—John R. Duncan; Frank D. Gilliam

[57] ABSTRACT

An arrangement for attaching and quickly disconnecting and jettisoning a rocket booster from a core space vehicle. The arrangement includes a housing connected at one end to the booster and a segmented nut carried within the housing that threadedly engages a bolt end of an interface mounting clevis secured to the space vehicle. A retainer both locks the segmented nut on the bolt and is responsive to high pressure fluid to slide out of locking engagement with the nut and to urge a conically shaped wedge into a shaped end of the segmented nut to force the segments outwardly out of threaded engagement with the bolt end to disconnect the booster from the space vehicle. High pressure fluid is also applied to a piston having a plunger in engagement with the bolt end so that the bolt end is swiftly driven out of the housing and the booster is thereby jettisoned form the space vehicle. The high pressure fluid is preferably provided by a pyrotechnic device.

20 Claims, 2 Drawing Sheets

ARRANGEMENT FOR ATTACHMENT AND QUICK DISCONNECT AND JETTISON OF ROCKET BOOSTER FROM SPACE VEHICLE

BACKGROUND OF THE INVENTION

The present invention relates to an improvement in separably connecting a rocket booster to a space vehicle and more particularly, but not by way of limitation, to a thrust system for attaching and quickly disconnecting and jettisoning a rocket booster from a core space vehicle.

In connection with the launch of a space vehicle and its associated payload into space it is necessary to expend a significant amount of energy. In order to achieve this energy it is common to associate one or more boosters with the main core launch vehicle. These boosters are commonly solid fuel rocket boosters that are separably arranged around the aft end of the core space vehicle. After lift off, the energy of the rocket boosters is expended at a predetermined rate until all of the solid rocket fuel has been used. The usefulness of the rocket boosters has then ended and it is necessary to separate the boosters from the launch vehicle as expeditiously as possible to avoid any drag from the now useless boosters.

The present practice for disengaging a solid rocket booster from the core launch vehicle and jettisoning the booster from the core space vehicle contemplates powering the disengagement and jettisoning functions by separate energy sources. Commonly, the structural joints connecting the solid rocket booster to the core space vehicle are severed by pyrotechnic means. Once severed from the core vehicle the boosters are then jettisoned from the immediate vicinity of the core vehicle by suitable thrusters to preclude any incidental contact between the boosters and the core vehicle.

SUMMARY OF THE INVENTION

Briefly stated, the present invention contemplates a unitary arrangement for attaching and quickly disconnecting and jettisoning a booster rocket from a core space vehicle that includes a hollow housing that is connected at one end to a booster and a segmented nut carried within the housing that threadedly engages a bolt end of a bolt arrangement secured to an interface mounting clevis secured to the core space vehicle which takes high core vehicle/booster interface loads while serving as a highly reliable disconnect. A retainer ring surrounds the segmented nut and by means of inwardly extending lands that hold shear pins connected to the nut maintain the nut in a locked position. The retainer is responsive to high pressure fluid from a high pressure source, such as a pyrotechnic device, to shear the pins at a predetermined pressure and to slide out of locking engagement with the nut. As the retainer is urged out of its locking position, it also drives a frustroconical wedge element into engagement with the segmented nut to force the nut segments out of engagement with the bolt end to disconnect the booster from the space vehicle.

High pressure fluid from the same source is introduced against a piston/plunger slidably contained within the housing so that the plunger which engages the bolt end forcibly drives the bolt end out of the housing to thereby quickly jettison the housing and connected booster from the core space vehicle. While a common pyrotechnic cartridge is presently preferred as the common high pressure power source, it is also within the scope of the invention to use stored pneumatic pressure as an alternate power source.

The combined attachment, disconnect and jettison arrangement of the present invention is ruggedly constructed and adapted to carry loads between the booster and the core vehicle during the period the booster is to be connected to the core vehicle. The present invention eliminates the pyrotechnic fasteners at the interface joints between the booster and the core vehicle of the present vehicle of the present practice. Also, the present invention combines the thrusting function as an integral portion of the attachment structure. The thrusting function is then able to disengage the interface joint and perform the separation and jettison function in one continuous operation while using one common pyrotechnic cartridge for the high pressure power source.

The present invention also simplifies the attachment of the solid rocket booster to the core vehicle and by simplification of the structure and combining of functions is able to increase the reliability of the system and to reduce its cost and weight. The installation of the solid rocket boosters on the core vehicle is also simplified and the time required for installation is reduced.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar numerals refer to similar parts in the various views.

DETAILED DESCRIPTION OF THE INVENTION

Figure 1:
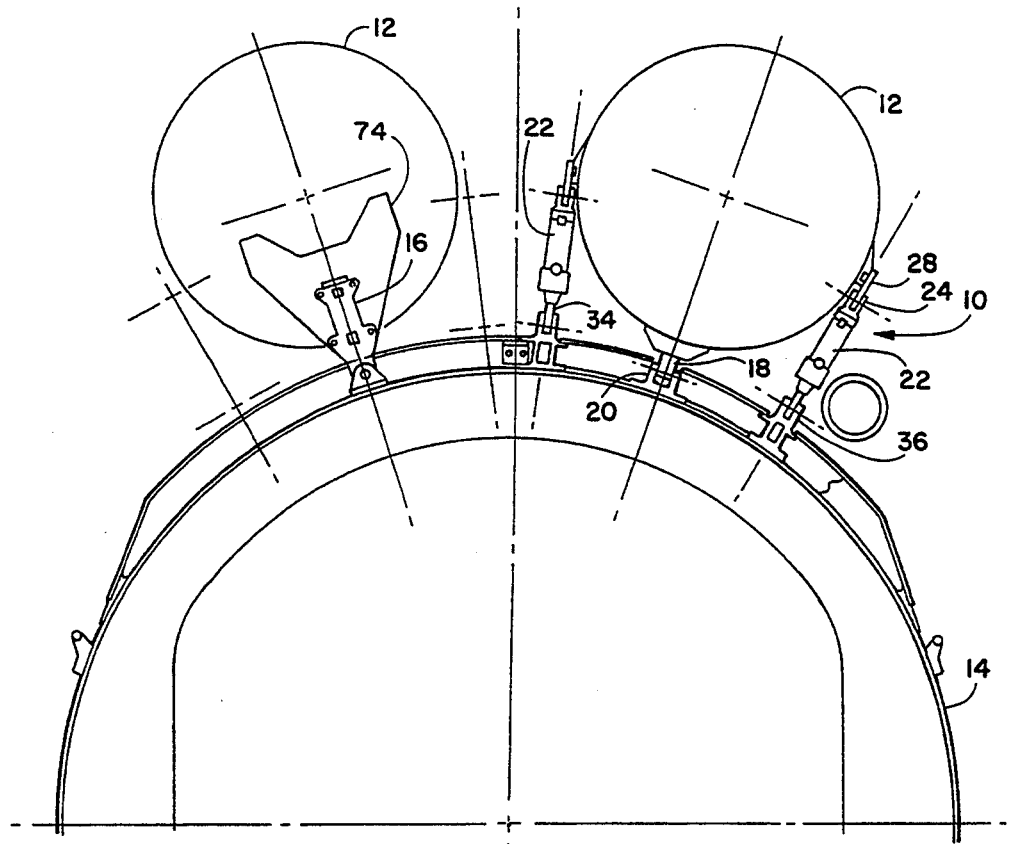
FIG. 1 is a top view which illustrates the use of forward and aft arrangements illustrating a preferred embodiment of the present invention for attaching and quickly disconnecting jettisoning a rocket booster from a structural driving connection to a core vehicle.

Referring now to the drawings in detail and in particular to FIG. 1, reference character 10 generally designates an arrangement for attaching and quickly disconnecting and separating and jettisoning a rocket booster 12 from a core space vehicle 14. The arrangement 10 is directed to an embodiment adapted for attachment of the aft portion of the booster 12 to the space vehicle 14 while the arrangement 16 is directed to an embodiment as adapted for attachment of the forward portion of the booster 12 to the vehicle 14. While two boosters are seen in FIG. 1, it should be recognized that commonly a plurality of booster 12 are utilized depending on the particular space vehicle application. A center pin 18 carried by the booster 12 cooperates with a suitable fitting 20 on the space vehicle 14 to assist in carrying loads.

Figure 2:
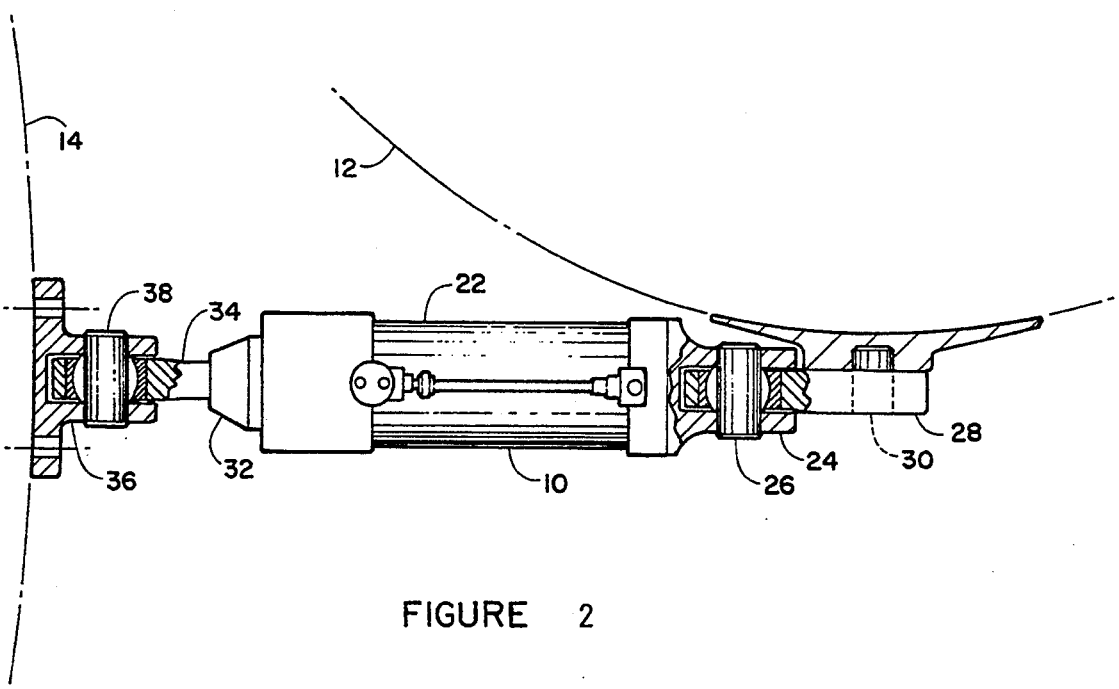
FIG. 2 is a top view of the aft thruster shown in FIG. 1.
Figure 3:
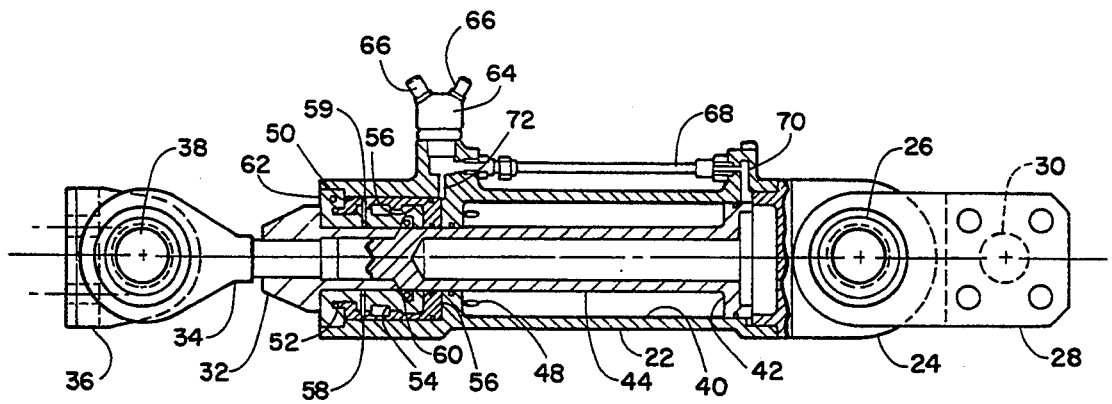
FIG. 3 is a side view shown partially in section and illustrating the arrangement of FIG. 2 is used to releasably secure a rocket booster at its aft end to a core space vehicle.

Referring now to FIGS. 2 and 3, it will be seen that the thruster arrangement 10 for the aft application includes a hollow housing 22 that is provided at one end with a suitable clevis 24 that uses a threaded plug 26 to connect to an interface mounting fitting 28 that is secured to the booster 12 by means of a self aligning bearing 30.

At the other end of the housing 22, a bolt means comprising a bolt 32 having an associated bolt end 34 extends into the housing 22 for coupling therewith. The bolt or rod end 34 is secured to the core vehicle 14 by a interface mounting clevis 36 mounted on the vehicle 14. The clevis 36 is provided with a suitable self aligning bearing 38 that receives the rod end 34 and thereby attaches the booster 12 to the core space vehicle 34.

Referring now to FIG. 3, it will be seen that the housing 22 is provided with a first chamber 40 in which a piston 42 having a longitudinally extending plunger 44 is slidably disposed. The plunger 44 has a central portion 46 that extends into the bolt 32 operatively engages it without being fixed to it and being easily separable therefrom during the jettisoning function. The bolt 32, as seen here, threadedly engages the rod end 34. The housing 22 is provided with a plurality of vent holes 48 to exhaust the first chamber 40 as the piston 42 is driven longitudinally therein as will be explained in detail later.

A second chamber 50 is provided in the housing 22 to receive a coupling means to connect the housing 22 to the bolt 32. This coupling means takes the form of a segmented nut 52 which threadedly engages the bolt 32 secured to the rod end 34. The segmented nut 52 is provided with a plurality of spaced circumferential outwardly extending ribs 54. A locking means is provided to selectively lock the segmented nut 52 on the bolt 32. This locking means is seen as an annular retainer cup 56 that is slidably disposed within the second chamber 50 of the housing 22 and also slidably disposed on the plunger 44. The retainer cup 56 is provided with a plurality of spaced inwardly extending lands 58 that cooperate with the ribs 54 to maintain the segmented nut 52 in a locked position on the bolt 32 for carrying loads imposed by the booster 12. A plurality of shear pins 59 connect the lands 58 and the ribs 54 so that only a predetermined lateral pressure on the retainer element 56 will shear the shear pins 59 and move the retainer element out of locking engagement with the segmented nut 52.

A frusto-conically shaped wedge element 60 is slidably disposed on the plunger 44 within the retainer element 56 and is received by a complementarily shaped surface provided in the end of the segmented nut 52. A base element 62 is fastened in the end of the housing 22 and surrounds the bolt 32.

A source of high pressure fluid such as a pyrotechnic cartridge 64 which may be fired by suitable contacts 66 is coupled to the housing 22 and communicates with the first chamber 40 in the housing 22 by a flexible hose 68 that connects to a passage way 70 that permits communication with the portion of the chamber 40 on one side of the piston 42. The cartridge 64 also communicates with the second chamber 56 via a passageway 72 to provide fluid pressure to the end of the retainer element 56.

Figure 4:
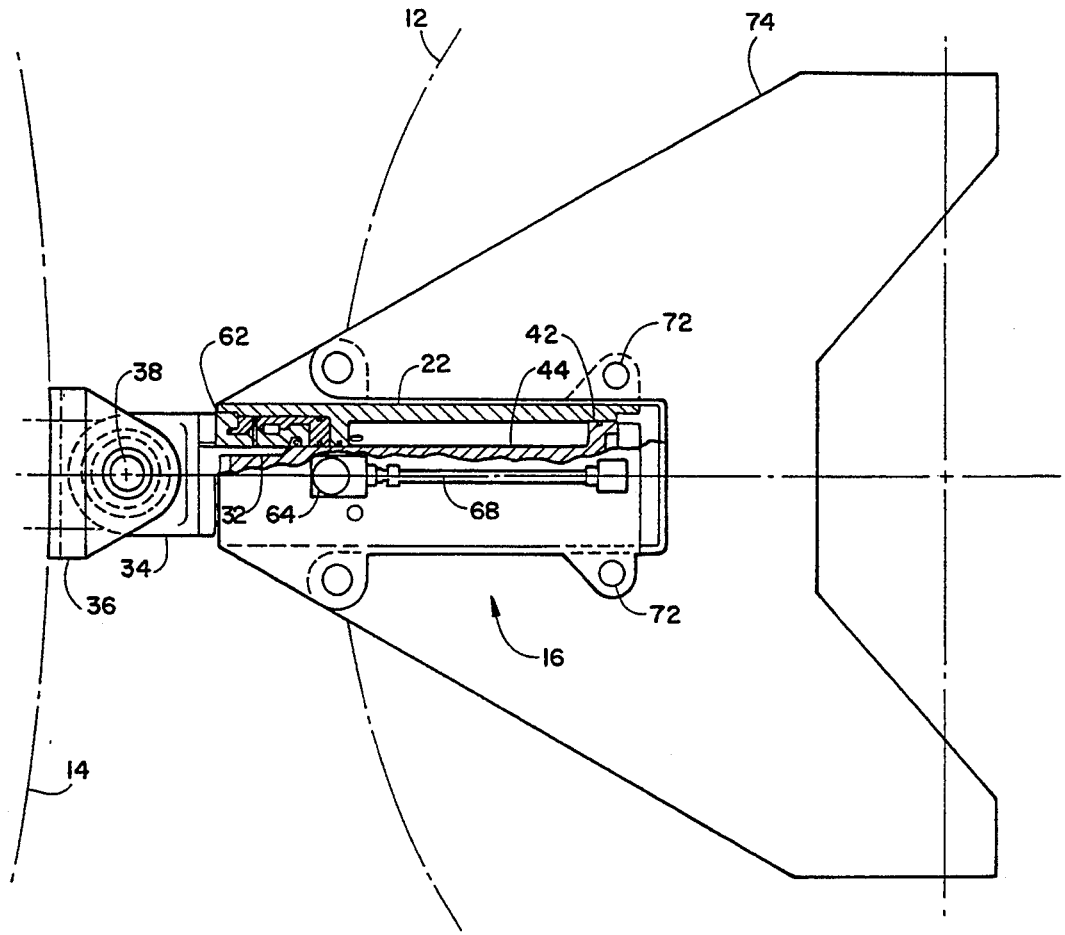
FIG. 4 is a top view shown partially in section illustrating how the arrangement of FIG. 1 releasably secures a rocket booster at its forward end to a core space vehicle.

Referring to FIG. 4, it is seen that the thruster 16 provided for forward attachment to the booster 12 is substantially the same as the thruster 10 shown in FIGS. 2 and 3 for aft attachment to the booster 12. Here the housing 22 is secured by a plurality of bolts 72 to a suitable fork fitting 74 secured to the forward portion of the booster 12. While the pressure source 64 for operation of the thruster 10 has been shown to be a pyrotechnic cartridge, it would be within the scope of the invention to provide a pneumatic source of pressurized gas.

OPERATION

For a discussion of the operation of the present invention it would be most convenient to refer to FIG. 3. When the energy of the booster 14 has been expended and it is desired to disconnect and jettison the booster 14, the pyrotechnic cartridge 64 is fired to create a source of high pressure combustion gases that flow through passageway 72 into the second chamber 50 and against the end of the retainer member 56. The retainer member 56 is urged longitudinally on the plunger 44 to move the lands 54 out of engagement with the ribs 54 of the segmented nut 52 and thereby out of locking engagement to free the segmented nut for outward expansion. As the retainer member 56 is driven longitudinally on the plunger 44 it engages the conical wedge element 60 and drives it longitudinally as well causing the segments of the nut to move away from engagement with the bolt 32. It is to be understood that the shear pins 59 are sheared upon application of the high pressure fluid to the retainer element 52 and slide the element 52 longitudinally into an unlocked position.

At this point the thruster is disconnected from coupling engagement to the bolt 32 and to the connected space vehicle 14. The high pressure gas also flows through the tube 68 into the passageway 70 and against the piston 42. Since the plunger 44 of the piston 42 engages the bolt 32, expansion of the gas into the chamber 40 causes the piston to slide within the chamber 40. Since the position of the bolt 32 is fixed by connection to the space vehicle 14 the housing 22 is driven longitudinally away from the piston 42 to expel the bolt 32 from the housing 22 and thrust or jettison the housing 22 and connected booster 12 from the engagement with the space vehicle 14. It is to be appreciated that with the very high pressures provided by the pyrotechnic cartridge 64 that the foregoing sequence of events of the operation of the thruster will occur very rapidly. It should also be appreciated that the various dimensions of the invention may be easily tailored to accommodate a variety of applications of the thruster.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method of operation may be resorted to without departing from the spirit and scope of the invention.

What is claimed is:

1. An arrangement for attaching and quickly disconnecting and jettisoning a booster rocket from a core space vehicle, which arrangement comprises:

a hollow housing connected at one end to a booster rocket;

a coupling means carried within the housing at its opposing end and adapted to releasably couple the housing and connected rocket booster to a core space vehicle;

a locking means cooperating with the coupling means to lock the coupling means into position for coupling the housing to the space vehicle and to selectively unlock the coupling means;

a drive means which is activatable by the locking means to cooperate with the coupling means to cause it to decouple the housing from the space vehicle;

piston drive means slidably carried within the housing and activatable, after the coupling means has release the housing from connection to the space vehicle, to drive the housing and booster rocket away from the space vehicle, and pressure means carried by the housing and adapted to selectively move the locking means from a locking position and into operative engagement with the drive means to cause it to drive the coupling means out of coupling connection to the space vehicle and also to slide the piston drive means within the housing to drive the housing and booster rocket away from the space vehicle for quick disconnecting and jettisoning therefrom.

2. The arrangement as described in claim 1 wherein the coupling means includes a segmented threaded nut that threadedly engages a bolt connected to the core space vehicle.

3. The arrangement as described in claim 2 wherein the locking means includes an annular retainer member which in its locking position secures the segmented threaded nut in its threaded engagement with the bolt connected to the space vehicle and which may be selectively moved along the longitudinal axis of the housing to unlock the coupling means.

4. The arrangement as described in claim 3 wherein the drive means includes an annular generally conically shaped wedge element that engages the segmented nut and which is selectively driven by operative engagement with the retaining member to expand the segmented nut radially outward and out of threaded engagement with the bolt connected to the space vehicle and thereby disconnect the housing and connected booster from the space vehicle.

5. The arrangement as described in claim 4 wherein the piston drive means includes a piston having a plunger that extends longitudinally within the housing and which may be driven by the pressure means to slide longitudinally within the housing to engage the bolt connected to the space vehicle so as to drive the housing and associated booster rocket way from the space vehicle.

6. The arrangement of claim 5 wherein the pressure means includes a source of high pressure fluid which communicates with a first portion of the interior of the housing to selectively urge the retainer member out of locking engagement with the threaded segmented nut and to urge the retainer member against the conically shaped wedge element to drive the segmented nut out of threaded engagement with the bolt and which also communicates with a second portion of the interior of the housing to exert driving pressure on the piston so as to slide the piston longitudinally within the housing and into driving engagement with the bolt connected to the space vehicle whereby the housing and associated booster are quickly disconnected and jettisoned from the space vehicle.

7. The arrangement of claim 6 wherein the pressure means includes a pyrotechnic device which upon ignition provides a source of pressurized combustion gases.

8. An arrangement for attaching and quickly disconnecting and jettisoning a booster rocket from a core space vehicle, which arrangement is connected to the core space vehicle by an interface mounting clevis secured on the space vehicle and that comprises:

a hollow housing that is connected at one end to a booster rocket;

a bolt means connected at one end to the interface mounting clevis on the space vehicle and having an opposing threaded bolt end that extends into the opposing end of the housing;

a coupling means carried within the housing and adapted to releasably couple the housing and connected booster rocket to the bolt end of the bolt means;

a locking means cooperating with the coupling means to selectively lock the coupling means to the bolt end;

a drive means which is activatable by the locking means to decouple the coupling means from coupling engagement with the bolt end;

piston drive means which engages the bolt end and is slidably carried within the housing and activatable, after the coupling means has been released from engagement with the bolt, to maintain engagement with the bolt end while sliding longitudinally within the housing to drivingly separate the housing and associated booster from the space vehicle, and pressure means coupled to the housing to provide a source of high pressure fluid to the locking means to unlock the coupling means and to actuate the drive means to decouple the coupling means from engagement with the bolt end thereby disconnecting the booster from the space vehicle, the pressure means also supplying high pressure fluid to the piston means to slidingly drive the piston within the piston housing to cause the bolt end to be forcibly expelled from the housing as the housing and associated booster are jettisoned from the space vehicle.

9. The arrangement of claim 8 wherein the coupling means comprises a segmented nut that threadedly engages the bolt end, which nut is provided with at least one outwardly extending circumferentially extending rib.

10. The arrangement of claim 9 wherein the locking means comprises an annular retainer member that surrounds the segmented nut and which is provided with at least one inwardly extending land that cooperates with the complementary outwardly extending rib provided on the segmented nut to maintain the segmented nut in coupled engagement with the bolt end, the locking means upon application of pressurized fluid from the pressure means being moved longitudinally within the housing so as to move the land from cooperation with the rib on the segmented nut and to also actuate the drive means to decouple the segmented nut from threaded engagement with the bolt end.

11. The arrangement of claim 10 wherein the arrangement further includes a plurality of shear pins which engage the coupling means and the locking means to ensure that the locking means is moved to an unlocking position only upon application of a predetermined pressurized fluid by the pressure means sufficient to shear the shear pins.

12. The arrangement of claim 11 wherein the drive means comprises a generally conically shaped annular element that is received by a complementarily shaped surface of the segmented nut whereby the application of pressure on the element by the retainer element forces the segmented nut outwardly out of threaded engagement with the bolt end.

13. The arrangement of claim 12 wherein the housing mounted onto a fork member connected to the forward portion of the booster.

14. The arrangement of claim 12 wherein the housing is provided with a clevis mounting means that is coupled by a self aligning bearing to interface mounting means carried at an aft position of the booster.

15. An arrangement for attaching and quickly disconnecting and jettisoning a booster rocket connected to an interface mounting clevis carried by a core space vehicle and that comprises:

a generally cylindrical hollow housing that is connected at one end to a booster rocket;

bolt means connected at one end to the interface mounting clevis and having an opposing end that is provided with a threaded bolt end that extends into the other end of the hollow housing;

a piston means slidably positioned within a first chamber within the housing and having a longitudinally extending plunger that engages the bolt end;

a coupling means positioned within a second chamber within the housing and adapted to releasably couple the housing and connected booster rocket to the bolt end;

a locking means positioned within the second chamber and slidably carried on the plunger of the piston means and cooperating with the coupling means to selectively lock the coupling means to the bolt end;

a drive means slidably positioned on the plunger within the locking means and engaging the coupling means to selectively decouple the coupling means from the bolt end, and pressure means coupled to the housing and communicating with the second chamber within the housing to selectively supply high pressure fluid to the locking means to slide it out of locking engagement with the locking means and to further slide it into driving engagement with the drive means to cause it to slide longitudinally along the plunger and to decouple the coupling means from the bolt end, the pressure means also supplying high pressure fluid to the first chamber to urge the housing longitudinally as the plunger of the piston means maintains engagement with the bolt end to forcibly jettison the housing and booster from the core space vehicle.

16. The arrangement of claim 15 wherein the coupling means comprises a segmented nut that threadedly engages the bolt end and which is provided with a plurality of spaced external annular ribs.

17. The arrangement of claim 16 wherein the locking means that comprises an annular cylindrical retainer member slidably positioned on the plunger that is provided with a plurality of spaced internal lands that cooperate with the ribs of the segmented nut when the retainer member is positioned in its locking position to ensure threaded engagement of the segmented nut with the bolt end.

18. The arrangement of claim 17 wherein a plurality of shear pins extend into the retainer member and into the segmented nut to maintain the retainer member in its locked position until a predetermined relative motion between the retainer member and segmented nut shears the pins.

19. The arrangement of claim 18 wherein the drive member comprises a frustro-conical member having a central bore that slidably receives the plunger of the piston means, the frustro-conical member cooperating with a complementarily shaped surface of the segmented nut.

20. The arrangement of claim 19 wherein the pressure means comprises a pyrotechnic device carried on the housing so that upon ignition provides high pressure combustion gases to the second chamber of the housing to provide for disconnecting of the coupling means from the bolt end to disconnect the booster from the core space vehicle and also provides high pressure gases to the first chamber to drive the piston means against the bolt end causing the bolt end to be driven from the housing as the housing is urged in the opposing direction by the high pressure gases to quickly jettison the housing and associated booster way from the space vehicle.

* * * * *